United States Patent
Bulgatz et al.

[11] Patent Number: 6,116,570
[45] Date of Patent: Sep. 12, 2000

[54] ELECTROMAGNETIC ACTUATOR WITH INTERNAL OIL SYSTEM AND IMPROVED HYDRAULIC LASH ADJUSTER

[75] Inventors: Dennis Bulgatz, Williamsburg; Robert W. McFarland, Newport News, both of Va.; Rainer Kerler, Wuerzburg, Germany

[73] Assignee: Siemens Automotive Corporation, Auburn Hills, Mich.

[21] Appl. No.: 09/268,291

[22] Filed: Mar. 15, 1999

Related U.S. Application Data

[60] Provisional application No. 60/080,020, Mar. 30, 1998.

[51] Int. Cl.[7] ........................... F16K 31/02; F16K 31/12; F16K 31/00; F01L 9/04; F01M 1/06
[52] U.S. Cl. ..................... 251/129.1; 251/54; 251/355; 123/90.11; 123/90.35; 123/90.55
[58] Field of Search ............................. 123/90.11, 90.35, 123/90.55, 188.9, 196; 251/129.1, 54, 57, 355; 335/266, 267, 268

[56] References Cited

U.S. PATENT DOCUMENTS

| | | | |
|---|---|---|---|
| 1,714,954 | 5/1929 | Hanson et al. | |
| 1,938,042 | 12/1933 | Robinson | 184/6 |
| 2,057,123 | 10/1936 | Ulrich | 184/6 |
| 2,155,855 | 4/1939 | Berry | 184/6 |
| 2,349,203 | 5/1944 | Spencer | 184/6 |
| 2,354,926 | 8/1944 | Patterson | 184/6 |
| 2,716,972 | 9/1955 | Farny et al. | 123/90 |
| 2,722,925 | 11/1955 | McElhinney | 123/90 |
| 2,966,151 | 2/1960 | Wood | 123/90 |
| 3,056,071 | 9/1962 | Baker et al. | 317/158 |
| 3,345,976 | 10/1967 | Pope et al. | 123/188 |
| 3,509,858 | 5/1970 | Scheibe et al. | 123/90 |
| 3,738,337 | 6/1973 | Massie | 123/90.12 |
| 3,882,833 | 5/1975 | Longstaff et al. | 123/90.1 |
| 3,885,546 | 5/1975 | Foley et al. | 123/188 P |
| 3,998,199 | 12/1976 | Melchoir | 123/188 GC |
| 4,022,294 | 5/1977 | Coulin | 184/6.9 |
| 4,777,915 | 10/1988 | Bonvallet | 123/90.11 |
| 4,924,825 | 5/1990 | Spell | 123/90.55 |
| 5,070,827 | 12/1991 | Krieg et al. | 123/90.48 |
| 5,074,256 | 12/1991 | Saito | 123/41.77 |
| 5,074,259 | 12/1991 | Pusic | 123/90.11 |
| 5,117,213 | 5/1992 | Kreuter et al. | 335/219 |
| 5,131,624 | 7/1992 | Kueuter et al. | 251/129.18 |
| 5,327,860 | 7/1994 | Krüger | 123/90.55 |
| 5,347,961 | 9/1994 | Buehrle, II et al. | 123/90.11 |
| 5,350,153 | 9/1994 | Morinigo | 251/129.1 |
| 5,720,242 | 2/1998 | Izuo | 123/90.11 |
| 5,762,035 | 6/1998 | Schebitz | 123/90.11 |

FOREIGN PATENT DOCUMENTS 2 126 651   6/1984   United Kingdom.

*Primary Examiner*—Kevin Shaver
*Assistant Examiner*—David A Bonderer

[57] ABSTRACT

An electromagnetic actuator 10 is provided and includes an upper electromagnet 12, a lower electromagnet 14 spaced from the upper electromagnet and an armature 16 mounted for movement between the upper and lower electromagnets. Shaft structure 20 is operatively associated with the armature for movement therewith. A gas exchange valve 30 is operated by the armature. At least one bushing 24 supports the shaft structure. A metering valve 38 and port structure 60 are provided in the actuator and are constructed and arranged to communicate hydraulic fluid from a source thereof with the at least one bushing and with the armature to cool the armature. The metering valve is preferably associated with a hydraulic lash adjuster 40 which is constructed and arranged to provide hydraulic fluid to the lash adjuster only when the gas exchange valve is in a closed position.

28 Claims, 3 Drawing Sheets

FIG. 1
FIG. 1A
FIG. 1B
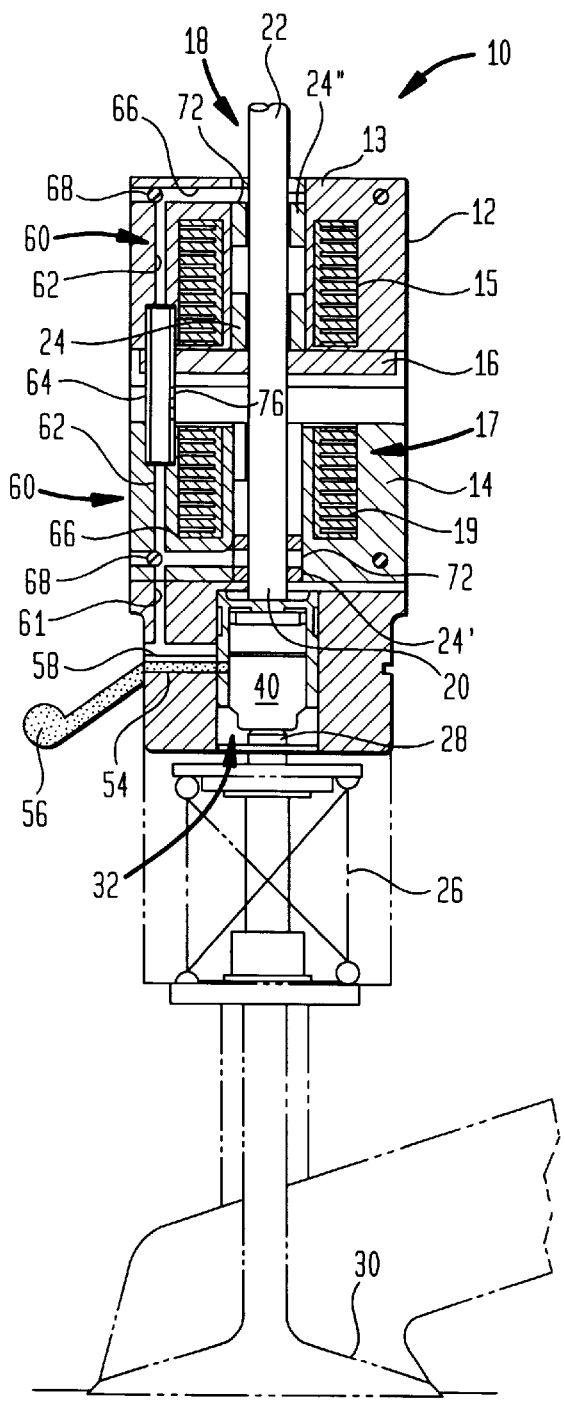
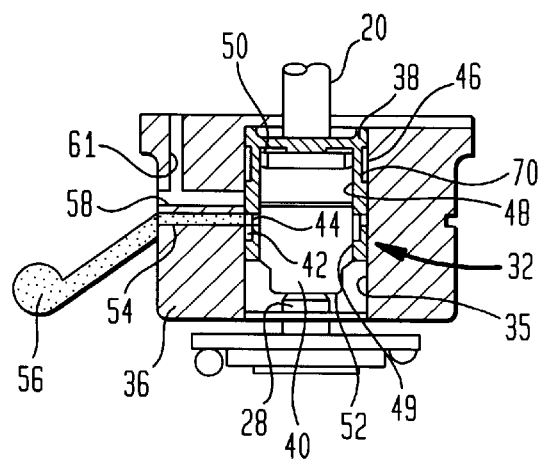
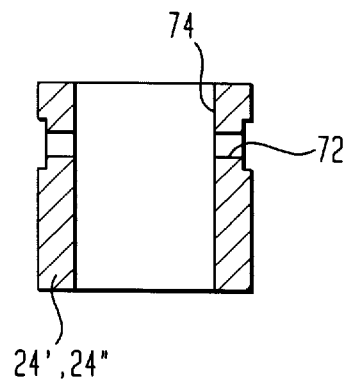

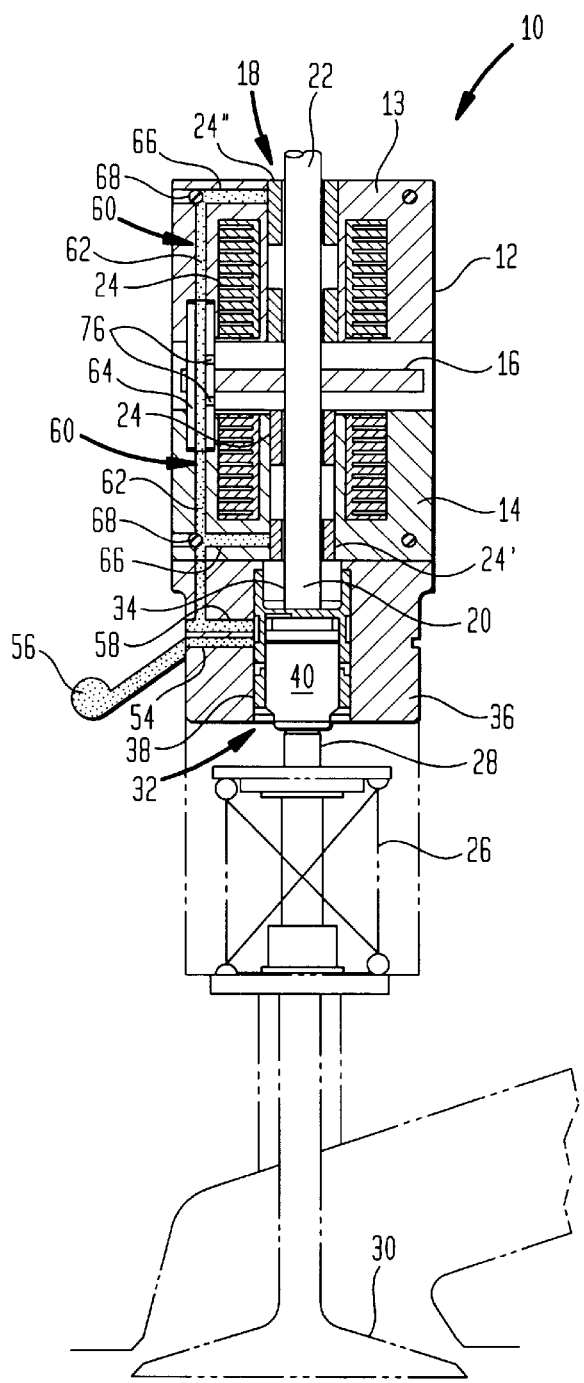
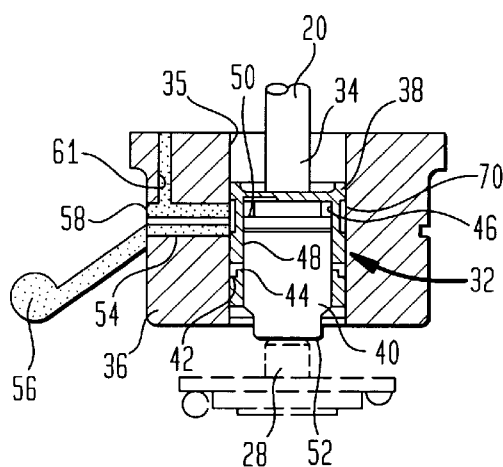
FIG. 2
FIG. 2A 6,116,570

ELECTROMAGNETIC ACTUATOR WITH INTERNAL OIL SYSTEM AND IMPROVED HYDRAULIC LASH ADJUSTER

This application claims the benefit of U.S. Provisional Application No. 60/080,020, filed on Mar. 30, 1998.

FIELD OF THE INVENTION

This invention relates to an electromagnetic actuator for a vehicle engine and more particularly, to an internal oil lubrication and cooling system and an improved hydraulic lash adjuster to compensate for lash between an armature of the actuator and a gas exchange valve driven by the armature.

BACKGROUND OF THE INVENTION

A conventional electromagnetic actuator for opening and closing a valve of an internal combustion engine generally includes "open" and "close" electromagnets which, when energized, produce an electromagnetic force on an armature. The armature is biased by a pair of identical springs arranged in parallel. The armature is coupled with a gas exchange valve of t he engine. The armature rests approximately half-way between the open and close electromagnets when the springs are in equilibrium. When the armature is held by a magnetic force in either the closed or opened position (at rest against the open or close electromagnet), potential energy is stored by the springs. If the magnetic force is shut off with the armature in the opened position, the spring's potential energy will be converted to kinetic energy of the moving mass and cause the armature to move towards the close electromagnet. If friction is sufficiently low, the armature can then be caught in the closed position by applying current to the close electromagnet.

In order for the gas exchange valve to rest firmly against the valve seat and simultaneously allow the armature to contact the "close" electromagnetic, tolerances would need to be near zero on the individual components. This is not feasible and would still not account for differential thermal expansion and wear. Simultaneously seating of the gas exchange valve and armature requires an adjustable element to be included between the armature and gas exchange valve. One typical type of adjustable element used conventionally on most modern engines with cam driven valves is a hydraulic tappet, also known as a hydraulic lash adjuster. For proper function, the hydraulic lash adjuster should have a very high stiffness when acted on by a transient load, such as during the motion of the gas exchange valve, but must be compliant during the dwell time of the gas exchange valve on the valve seat. The function described above can be achieved by using a piston-cylinder assembly with a check valve and leakage orifice with the operating fluid typically being the engine motor oil. The peak static force which the lashed adjuster can exert in order to expand is determined by the piston area and the engine oil pressure, and is typically very small. The force required to retract the lash adjuster is very large, and is determined by the leakage orifice area which is typically only the annular clearance between the piston and the cylinder diameter.

Prior to the start of the system, oil pressure is zero and it can be assumed that the lash adjuster has leaked down to its minimum length. When the engine is started, the gas exchange valve begins to move as necessary for engine operation and oil pressure begins to build up. Valve operation starts prior to oil pressure being available to the lash adjuster and, until oil pressure is available, a gap will exist between the armature and the gas exchange valve when the valve is in the close position (referred to typically as valve lash). Once oil pressure is available, the cylinder in the lash adjuster will fill with oil and begin to expand the piston until zero lash is achieved.

It has been found that, when used with an electromagnetic actruator, the conventional hydraulic lash adjuster can become too long due to unwanted harmonic motion of the gas exchange valve. For example, if the armature hits the "open" electromagnet at a higher than desired impact velocity, the kinetic energy of the gas exchange valve will keep it moving in the open direction after the armature has stopped, releasing any load on the hydraulic lash adjuster (valve toss). If oil pressure is applied to the hydraulic lash adjuster when the adjuster is unloaded, it will undesirably extended in length. Accordingly, a need exists to prevent undesired filling of the lash adjuster so as to control when the piston of the lash adjuster is extended.

During operation of the actuator, another concern is lubrication of the moving parts and cooling of the actuator. Typically, a shaft or guide is associated with the armature and moves within bushings. If the shaft is not lubricated, high wear and high friction in the bushings may result during operation of the actuator. It is difficult to provide enough lubrication to the shaft since oil is available at the outside of the bushings, but lubrication is needed on the inside of the bushings between the shaft and the bushings. Accordingly, here is a need to provide metered lubrication of the shaft at the in side of the bushings.

In addition, the power required to operate an electromagnetic actuator produces heat. This heat affects the performance and durability of the actuator. Currently, the conventional methods used to remove heat from the actuator is conduction from the actuator to the engine block and by varying the amounts of convection to the surrounding environment. Accordingly, there is a need to provide oil cooling of an electromagnetic actuator to reduce the chance of the actuator temperature building to undesirable levels during high duty cycle periods.

SUMMARY OF THE INVENTION

An object of the present invention is to fulfill the needs referred to above. In accordance with the principles of the present invention, these objectives are obtained by providing an electromagnetic actuator including an upper electromagnet, a lower electromagnet spaced from the upper electromagnet, and an armature mounted for movement between the upper and lower electromagnets. A valve is operatively associated with the armature such that movement of the armature moves the valve between open and closed positions. A hydraulic lash adjuster is disposed between the armature and the valve. The hydraulic lash adjuster has an adjuster housing and a piston movable via hydraulic fluid within the adjuster housing to compensate for lash between the armature and the valve. Port structure is constructed and arranged to communicate hydraulic fluid from a source thereof with the piston. The hydraulic lash adjuster is constructed and arranged to direct hydraulic fluid, received from the port structure, to the piston only when the valve is in the closed position thereof.

In accordance with another aspect of the invention, an electromagnetic actuator is provided and includes an upper electromagnet, a lower electromagnet spaced from the upper electromagnet, and an armature mounted for movement between the upper and lower electromagnets. Shaft structure is operatively associated with the armature for movement therewith. At least one bushing supports the shaft structure. A metering valve and port structure are provided in the actuator and are constructed and arranged to communicate hydraulic fluid from a source thereof with the at least one bushing and with the armature to cool the armature.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

FIG. 1 is partial cross-sectional view of an electromagnetic actuator and gas exchange valve, provided in accordance with the principles of the preset invention, shown with oil filling a hydraulic lash adjuster in a valve closed condition;

FIG. 1a is an enlarged view of a hydraulic lash adjuster of FIG. 1,

FIG. 1b is an enlarged cross-sectional view of a bushing of the electromagnetic actuator of FIG. 1;

FIG. 2 is a partial cross-sectional view of the electromagnetic actuator and gas exchange valve of the invention, showing oil lubricating bushings and the armature during a valve mid-lift condition;

FIG. 2a is an enlarged view of the hydraulic lash adjuster of FIG. 2;

DETAILED DESCRIPTION OF THE INVENTION

Figure 3:
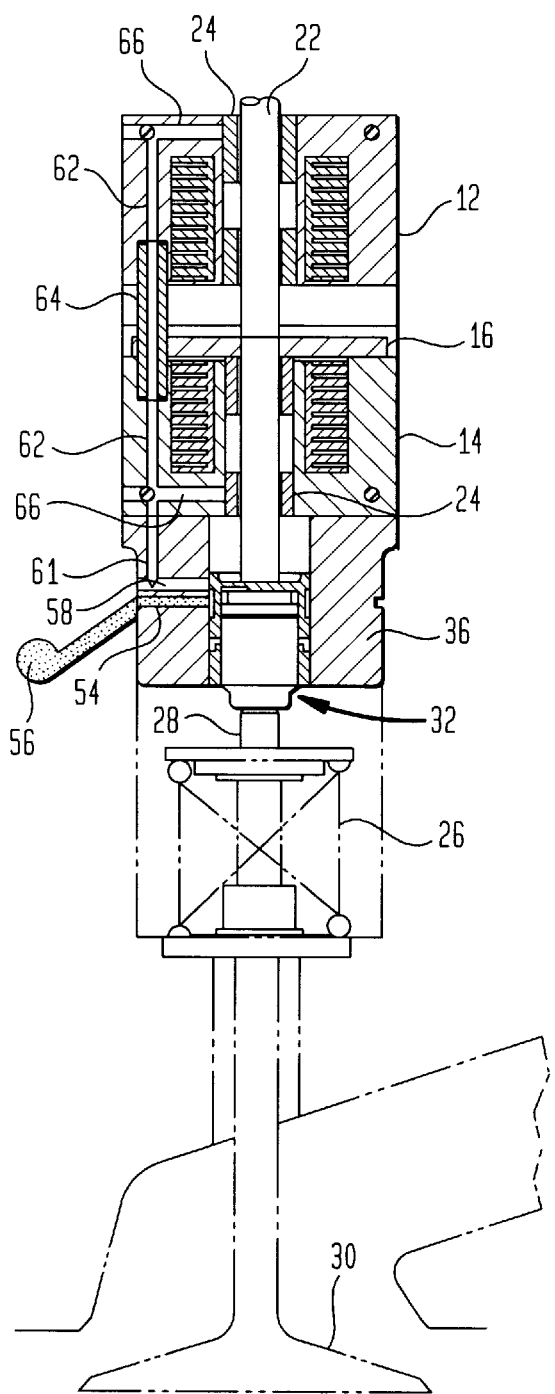
FIG. 3 is a partial cross-sectional view of the electromagnetic actuator and gas exchange valve of the invention at a fully open valve condition.

Referring to FIG. 1, a cross-sectional view of an electromagnetic actuator is shown, generally indicated 10, provided in accordance with the principles of the present invention. The electromagnetic actuator 10 includes an upper electromagnet 12 and a lower electromagnet 14. The upper electromagnet 12 includes an upper lamination core 13, preferably comprised of a plurality of stacked laminations and a coil assembly 15. The lower electromagnet is configured similarly having a lamination core 17 and a coil assembly 19. An armature 16 is arranged for movement between the electromagnets 12 and 14. The armature 16 is associated with shaft structure, generally indicated at 18. In the illustrated embodiment, the shaft structure 18 comprises a lower shaft 20 coupled to the armature and an upper shaft 22 aligned axially with the lower shaft 20 and constructed and arranged to be biased by a spring (not shown) so as to engage the armature 16. It can be appreciated that upper and lower shafts may be a unitary shaft member operatively associated with to the armature 16. Each of the upper and lower shafts 22 and 20, respectively, is housed in bushings 24 disposed in an axial bore extending through each electromagnet.

In the typical manner, a pair of opposing springs are associated with the armature 16. One spring 26 is shown in FIG. 1 and is associated with the stem 28 of the gas exchange valve 30. The other spring (not shown) is operatively associated with the end of the upper shaft 22.

As best shown in FIG. 1a, a hydraulic lash adjuster, generally indicated at 32, is disposed between an end of lower shaft 20 and the stem 28 of the gas exchange valve 30 (FIG. 1). The lash adjuster 32 is disposed in a bore 35 of a housing 36 which is in the form of a cylinder. Housing 36 is coupled to the lower electromagnet 14. The lash adjuster 32 comprises an adjuster housing 38 and a piston 40 disposed within the adjuster housing 38 for movement therein. The adjuster housing 38 includes a first groove 42 therein and a radial bore 44 communicating the first groove 42 with a bore 46 in which the piston 40 is housed. An annular gap 48 is provided above the radial bore 44 and between the periphery of piston 40 and the interior of the adjuster housing 38 so that hydraulic fluid may contact surface 50 of the piston 40 as will be explained in more detail below. An annular gap 49 is provided between the periphery of the piston 40 and the interior of the adjuster housing 38 to permit hydraulic fluid to leak therethrough to allow the piston to return to an unextended position. Piston 40 has a surface 52 which engages the end of the stem 28 of the gas exchange valve 30.

As shown in FIG. 1, port structure is provided in the actuator 10 to direct hydraulic fluid to various locations within the actuator 10. The port structure includes a first port 54 in the housing 36. The first port 54 is in communication with a source 56 of hydraulic fluid and with the bore 35 of the housing 36. The source of hydraulic fluid is preferably oil from the engine block of a vehicle. The port structure also includes a second port 58 in the housing 36 which is spaced from and parallel to the first port 54. The second port 58 is in communication with the bore 35 in the housing 36 and in communication with a generally vertically extending port 61 in the housing 36. As shown in FIG. 1, each of the upper and lower electromagnets 12 and 14, respectively, includes lamination channel structure, generally indicated at 60. The lamination channel structure is considered to be part of the port structure. Each of the lamination channel structures 60 comprises a first lamination port 62 communicating with a tube 64 and a second lamination port 66 disposed generally transverse with respect to the first lamination port 62 and in communication with the first lamination port 62. The second lamination port 66 has one end which communicates with an outside surface of the associated lamination core and the other end of each second lamination port 66 communicates with a bushing 24.

The tube 64 is provided in the space between the upper electromagnet 12 and the lower electromagnet 14 and extends through the armature 16 so as to carry oil from the lower electromagnet 14 to the upper electromagnet 12. Since the tube extends through the armature 16, the tube 64 can prevent rotation of the armature 16. In addition, the tube 64 may be provided with a shoulders to help support the lamination cores in an associated lamination housing (not shown) by preventing movement of the cores with respect to the lamination housing.

Core support pins 68 are used to seal the cross-drilled second lamination ports 66. These pins 68 are also used to secure the lamination cores of the upper and lower electromagnets 12 and 14, respectively, to an associated lamination housing (not shown).

As best seen in FIG. 2, the adjuster housing 38 includes a second annular groove 70 therein. Groove 70 is sized such that when the gas exchange valve 30 is in a mid-lift position between an open position (FIG. 3) and a closed position (FIG. 1), the first port 54 may communicate with the second port 58, the function of which will become apparent below.

Returning to FIG. 1, if oil pressure is applied to the hydraulic lash adjuster when the adjuster is not loaded, it will undesirably extend in length. To solve this problem of undesired filling (pumping) of the hydraulic lash adjuster, the invention ensures that oil pressure is suppled to the hydraulic lash adjuster 32 only while the gas exchange valve 30 is in a closed position, as shown in FIG. 1. Thus, only when the valve 30 is closed will oil flow from the source 56 through the first port 54 in housing 36 and through the first annular groove 42, into radial bore 44 of the adjuster housing 38, and through the gap 48 so as to be exerted on surface 50 of the piston 40 (FIG. 1a) to adjust the location of the piston 40 until zero lash is achieved.

With reference to FIGS. 2 and 2b, when the gas exchange valve 30 passes through a mid-lift position, the annular groove 70 is in a position to permit oil to pass from the first port 54 and into the second port 58. The second port 58 in turn communicates with vertical port 61 which communicates with the second lamination port 66 of the lower electromagnet 14. The second lamination port 66 directs oil to a lower bushing 24' to lubricate the lower shaft 20. In addition, oil is directed through the tube 64 and to the second lamination port 66 of the upper electromagnet 12. The second lamination port 66 of the upper electromagnet 12 directs oil to an upper bushing 24" to lubricate the upper shaft 22.

With reference to FIG. 2, the upper bushing 24" and the lower bushing 24' each are composed of porous material, such as sintered material. Thus, oil which is directed to these bushings passes through the pores therein and enters the bore of the bushing so as to provide oil to the associated shaft.

Alternatively, as shown in FIG. 1 and 1b, the bushings 24' and 24" may include a radial bore 72 which communicates with the axial bore 74 therein and with the associated second lamination port 66. Thus, oil from the second lamination port 66 may pass through the radial bore 72 and into the axial bore 74 to lubricate the associated shaft. As shown, the bushing may have a peripheral groove to supply the boxes 72 with oil.

As shown in FIGS. 1 and 2, the tube 64 includes openings 76 therein so as to provided metered oil to opposing sides of the armature 16 between the armature 16 and the upper and lower electromagnets 12 and 14. Oil delivered in this area cushions the landing of the armature 16 on the lamination core surface, and in doing so, reduces the acoustic emissions. The oil in this area also cools the actuator 10.

Thus, it can be appreciated that the adjuster housing 38 also functions as a metering valve to meter oil suppled to the bushings 24', 24" and armature 16. Although the hydraulic lash adjuster 32 is used to conveniently meter oil delivered to the bushings 24', 24" and armature 16, a metering valve separate from the lash adjuster 32 may be associated with the actuator 10 which performs this metering function. It can be appreciated that a metering valve can be omitted and oil pressure from the engine may be supplied to the bushings and to the armature.

Figure 3A:
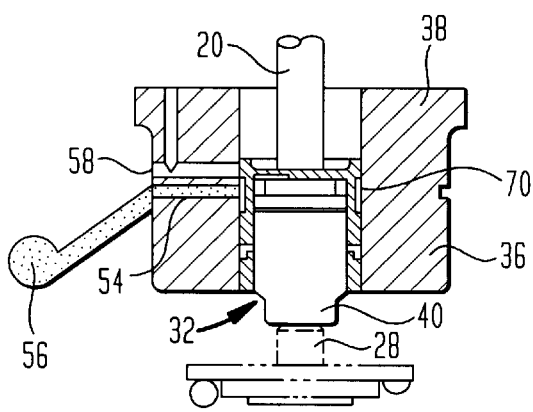
FIG. 3a is an enlarged view of the hydraulic lash adjuster of FIG. 3.

With reference to FIGS. 3 and 3a, when the gas exchange valve 30 moves to the fully open position, the hydraulic lash adjuster 32 is in a position whereby the second annular groove 70 is disposed below the second port 58 and is not in communication therewith. Thus, there is no communication between first port 54 and second port 58 and therefore, no oil is delivered to the bushings 24' and 24" or to the armature 16 when the gas exchange valve 30 is in the fully open condition.

Accordingly, with the structure of the invention, lubrication of the bushings 24', 24" and cooling of the armature occurs only when the gas exchange valve passes through the mid-lift position (FIG. 2).

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of The following claims.

What is claimed is:

1. An electromagnetic actuator comprising:
an upper electromagnet,
a lower electromagnet spaced from said upper electromagnet,
an armature mounted for movement between said upper and lower electromagnets,
a valve operatively associated with said armature such that movement of said armature moves said valve between open and closed positions,
a hydraulic lash adjuster between said armature and said valve, said hydraulic lash adjuster having an adjuster housing and a piston movable via hydraulic fluid within said adjuster housing to compensate for lash between said armature and said valve, and
port structure constructed and arranged to communicate hydraulic fluid from a source thereof with said piston,
wherein said hydraulic lash adjuster is constructed and arranged to direct hydraulic fluid, received from said port structure, to said piston only when said valve is in the closed position thereof.

2. The actuator according to claim 1, wherein said adjuster housing is generally cylindrical and has a continuous groove in a periphery thereof, said groove being in fluid communication with a surface of said piston, said groove being disposed in said adjuster housing at a position so as to communicate with said port structure only when said valve is in said closed position.

3. The actuator according to claim 1, wherein said actuator includes shaft structure operatively associated with said armature and said valve for movement therewith, said shaft structure being supported for movement within at least one bushing.

4. The actuator according to claim 3, wherein said at least one bushing includes an axial bore therethrough, a portion of said shaft structure extending through said axial bore, said port structure communicating with said at least one bushing so that hydraulic fluid may pass through said bushing to said axial bore and lubricate said shaft structure.

5. The actuator according to claim 4, wherein said at least one bushing is composed of porous material.

6. The actuator according to claim 5, wherein said porous material is sintered metal.

7. The actuator according to claim 4, wherein said at least one bushing includes a radial bore in communication with said axial bore and in communication with said port structure.

8. The actuator according to claim 2, wherein said actuator includes a shaft structure operatively associated with said armature and said valve for movement therewith, said shaft structure being supported for movement within at least one bushing.

9. The actuator according to claim 8, wherein said adjuster housing is disposed in a bore in a housing, said port structure including a first port in said housing, said first port being in communication with the source of hydraulic fluid and with said bore in said housing, said port structure including a second port in said housing spaced from said first port and generally parallel thereto, said second port being in communication with said bore in said housing and in communication with said at least one bushing, said adjuster housing including a second groove therein sized such that when said valve is in position between said open and closed positions, said second groove permits communication of hydraulic fluid between said first and second ports and provides a metered amount of hydraulic fluid to said at least one bushing.

10. The actuator according to claim 9, wherein said upper electromagnet includes an upper lamination core and said lower electromagnet includes a lower lamination core, said port structure includes a lamination channel structure in each of said lamination cores and a tube in the space between the electromagnets and generally adjacent to said armature permitting communication between said lamination channel structures, said lamination channel structures and said tube communicating with said second port.

11. The actuator according to claim 10, wherein a bushing is associated with each of the lamination cores, each bushing including an axial bore therethrough, a portion of said shaft structure extending through each bushing axial bore, said lamination channel structure communicating with an associated bushing so that hydraulic fluid may pass through said bushing to said axial bore and lubricate said shaft structure.

12. The actuator according to claim 11, wherein each of said bushings is composed of porous material.

13. The actuator according to claim 12, wherein said porous material is sintered metal.

14. The actuator according to claim 11, wherein each of said bushings includes a radial bore in communication with said axial bore and in communication with said associated lamination channel structure.

15. The actuator according to claim 10, wherein said tube includes openings therein to permit a metered amount of hydraulic fluid to be directed to opposing surfaces of said armature.

16. The actuator according to claim 10, wherein the lamination channel structure in each of said lamination cores comprises a first lamination port communicating with said tube and a second lamination port disposed generally transverse with respect to said first lamination port and in communication therewith, one end of said second lamination port communicating with an outside of said lamination core and another end of said second lamination port communicating with an associated bushing.

17. The actuator according to claim 16, wherein each of said lamination cores comprises a plurality of laminations, said second port in each lamination core being sealed to the outside of the associated lamination core by a support pin extending through each of said laminations.

18. An electromagnetic actuator comprising:
an upper electromagnet,
a lower electromagnet spaced from said upper electromagnet,
an armature mounted for movement between said upper and lower electromagnets,
shaft structure operatively associated with said armature for movement therewith,
at least one bushing supporting said shaft structure, and a metering valve and port structure in said actuator constructed and arranged to communicate hydraulic fluid from a source thereof with said at least one bushing,
wherein said metering valve is associated with a hydraulic lash adjuster of the actuator.

19. The actuator according to claim 18, wherein said port structure is constructed and arranged to direct hydraulic fluid to opposing surfaces of said armature.

20. The actuator according to claim 18, wherein said hydraulic lash adjuster is disposed in a bore in a housing, said port structure including a first port in said housing, said first port being in communication with the source of hydraulic fluid and with said bore in said housing, said port structure including a second port in said housing spaced from said first port and generally parallel thereto, said second port being in communication with said bore in said housing and in communication with said at least one bushing, hydraulic valve adjuster including a groove in a periphery thereof sized such that under certain conditions, said groove permits communication of hydraulic fluid between said first and second ports and provides a metered amount of hydraulic fluid to said at least one bushing.

21. The actuator according to claim 20, wherein said upper electromagnet includes an upper lamination core and said lower electromagnet includes a lower lamination core, said port structure includes lamination channel structure in each of said lamination cores and a tube in the space between the electromagnets and adjacent to said armature permitting communication between said lamination channel structures, said lamination channel structures and said tube communicating with the source of hydraulic fluid.

22. The actuator according to claim 21, wherein a bushing is associated with each of the lamination cores, each bushing including an axial bore therethrough, a portion of said shaft structure extending through said axial bore, said lamination channel structure communicating with an associated bushing so that hydraulic fluid may pass through said bushing to said axial bore and lubricate said shaft structure.

23. The actuator according to claim 22, wherein each of said bushings is composed of porous material.

24. The actuator according to claim 22, wherein each of said bushings includes a radial bore in communication with said axial bore and in communication with an associated lamination channel structure.

25. The actuator according to claim 21, wherein said tube includes openings therein to permit hydraulic fluid to be directed to said opposing surfaces of said armature.

26. An electromagnetic actuator comprising:
an upper electromagnet,
a lower electromagnet spaced from said upper electromagnet,
an armature mounted for movement between said upper and lower electromagnets,
shaft structure operatively associated with said armature for movement therewith,
at least one bushing having a pore therein, said bushing supporting said shaft structure,
structure in said actuator constructed and arranged to communicate hydraulic fluid from a source thereof with said at least one bushing such that hydraulic fluid may pass through said pore in said at least one bushing to lubricated said shaft structure, and
a metering valve in fluid communication with said structure to provide metered hydraulic fluid to said at least one bushing, said metering valve being associated with a hydraulic lash adjuster of the actuator.

27. The actuator according to claim 26, wherein said at least one bushing is composed of porous material defining said pore.

28. The actuator according to claim 26, wherein said pore is a bore through said at least one bushing.

* * * * *